March 1, 1966 F. M. POTTER ETAL 3,237,741
SHAFT DISCONNECT
Filed July 23, 1964
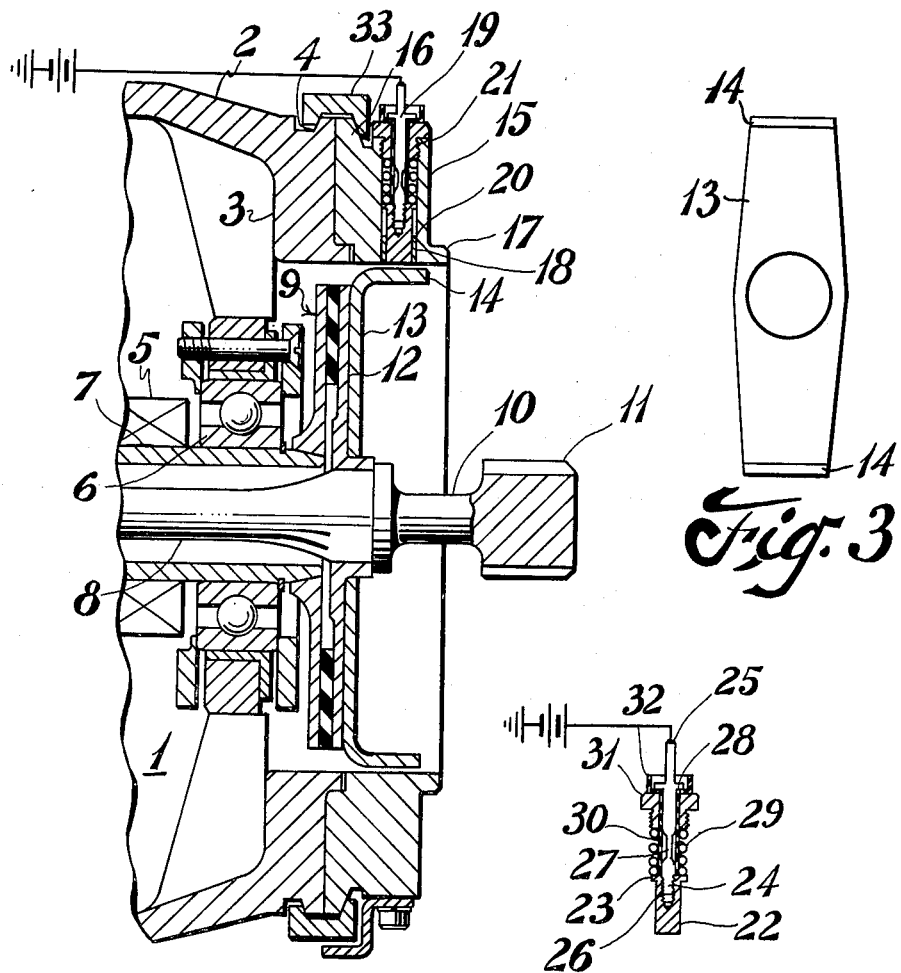
INVENTORS.
FREDERICK M. POTTER
BY WALTER R. DELLERA
LAWRENCE E GARTNER
*James M Nickels*
ATTORNEY United States Patent Office

3,237,741
Patented Mar. 1, 1966

3,237,741
SHAFT DISCONNECT
Frederick Milton Potter, Little Silver, Walter R. Dellera, New Shrewsbury, and Lawrence Edward Gartner, Red Bank, N.J., assignors to The Bendix Corporation, Eatontown, N.J., a corporation of Delaware
Filed July 23, 1964, Ser. No. 384,702
7 Claims. (Cl. 192—116.5)

The present invention relates to emergency quick disconnect devices and more particularly to an arrangement for disconnecting a driven member from a driving member.

In aircraft it is desirable to have some means for disconnecting an accessory from the engine upon a malfunction of the accessory. This is necessary in order to protect the engine and also other accessories driven by the engine. Heretofore the devices that have been developed are complicated, require excessive space and in general are not practical for aircraft use.

The present invention provides novel means for disconnecting an accessory that is relatively inexpensive, has no complicated parts and requires very little space. The device can be attached to and made a part of a mounting flange and incorporates a mechanism for shearing the shaft.

It is an object of the present invention to provide a novel emergency quick disconnect device.

Another object of the invention is to provide improved means for disconnecting a driven member from a driving member.

Another object of the invention is to provide improved means for disconnecting an accessory from an engine upon the malfunctioning of the accessory.

The above and other objects and features of the invention will appear more fully hereinafter from a consideration of the following description taken in connection with the accompanying drawing wherein one embodiment is illustrated by way of example.

In the drawing:

FIGURE 1 is a partial sectional view of an accessory embodying the invention.

FIGURE 2 is a sectional view of the decoupling pin of FIGURE 1.

FIGURE 3 is an end view of the bracket member of FIGURE 1.

Referring now to the drawing wherein like reference numerals designate like or corresponding parts throughout the different figures, for purposes of illustration, a dynamoelectric machine is indicated generally as the numeral 1. While the machine illustrated and described is a generator, it is understood that it could be any other type of accessory that might be driven from an aircraft. Further, only the portion of the generator 1 necessary for an explanation of the invention is illustrated. The machine 1 has a mounting head 2 terminating in a flange 3. The head 2 has a tapered section 4 adjacent to the flange 3 which extends around the periphery thereof.

A rotor 5 is mounted in the housing 2 by bearings 6 (only one of which is illustrated) such as is shown and claimed in U.S. Patent 2,846,600 by means of a hollow shaft 7. A torsional drive shaft 8 is positioned concentric in the shaft 7 and is connected thereto by splines (not shown) adjacent to the antidrive end. Also, the shaft 8 is connected to the shaft 7 at the drive end by a torsional vibration damper 9. The damper 9 may be of the type disclosed and claimed in U.S. Patent 2,487,934. The shaft 8 has a reduced section 10 and terminates in a splined section 11 which is adapted to mate with a driving member (not shown).

The vibration damper 9 has a flange 12 secured to the shaft 8 for rotation thereby. A bracket member 13 is secured to the flange 12 by brazing or other suitable means. The member 13 has axial extending projections 14.

A quick attach-detach flange, 15, as described in Patent No. 3,104,901 is adapted to be fastened to an engine drive pad (not shown) by bolts or other suitable means. The flange 15 has a tapered section 16 and a shoulder 17 which serves as a pilot for mounting on the drive pad. The flange 15 has a radially extending opening 18 adapted to receive a pin assembly 19. The opening 18 has a shoulder 20 and a threaded section 21.

The pin assembly 19 includes a pin member 22 which has a shoulder 23 and threaded section 24. A post 25 has a threaded section 26 adapted to mate with the threaded section 24 of the pin 22. Also, the post 25 has a reduced section 27 and a flange 28. A spring 29 surrounds the post 25 and is insulated therefrom by an insulating member 30. The spring 29 is held in compression by the shoulder 23 of the pin 22 and a spring retaining screw 31. The screw 31 is insulated from the post 25 by the insulating member 30 and an insulator cup 32.

In operation a retaining ring 33 coacts with the tapered sections 4 and 16 to secure the machine 1 to the mounting flange 15. A source of current for purpose of illustration may be a battery is connected to the end of the post 25. In the event it is desirable to disconnect the machine 1 from the engine the source of current is activated to pass a current through the pin 25 which will heat and weaken the reduced section, thus enabling the spring 29 to push the pin 22 through the opening 18 and into contact with the flange 14 of the member 13. Upon engaging the pin 22 the shaft 8 is brought to an abrupt halt which builds up sufficient force to shear the shaft 8 at the reduced section 10, thus disconnecting the machine from the engine drive pad. The portion of the shaft 8 on the machine side of the vibration damper 9 will also break, but after an interval of time required to wind up the long, slender portion of the shaft, approximately 1½ revolutions, due to the stored rotational energy of the rotor.

While passing electrical current through a fuse-like member has been illustrated and described as the means for triggering the pin, it is understood that other means could be used without departing from the scope of the invention.

Although only one embodiment of the invention has been illustrated and described, various changes in the form and relative arrangement of the parts, which will now appear to those skilled in the art, may be made without departing from the scope of the invention.

What is claimed is:

1. An emergency quick-disconnect device for disconnecting a driven shaft for a driving shaft comprising a driven shaft, having a reduced shear section, a bracket member having axially extending projections thereon secured to said driven shaft, a spring loaded pin member positioned adjacent to said projections, and means for actuating said spring loaded pin member to cause said pin member to engage said projections thereby causing said driven shaft to shear.

2. A disconnect device for disconnecting a driven auxiliary unit from an engine comprising a torsional drive shaft, having a reduced shear section adapted for engagement at one end with said engine and connected for driving said auxiliary unit, an axially projecting member secured to said shaft, a spring loaded pin positioned adjacent to said member, and means for actuating said pin into engagement with said member to cause said shaft to shear thereby disconnecting said unit from said engine.

3. The combination as set forth in claim 2 in which said means for actuating said spring loaded pin is an electrical current.

4. A disconnect device for disconnecting a driven dynamoelectric machine from an engine comprising a torsional drive shaft for driving a rotor of said machine, a radially extending bracket secured to said drive shaft, said drive shaft having a shear section adjacent to said bracket, said bracket having axially extending projections on the ends thereof, a spring loaded pin assembly positioned adjacent to said axially extending projections, and means actuating said pin assembly into contact with said extending projections to stop rotation of said drive shaft thereby to shear said drive shaft.

5. The combination as set forth in claim 4 in which said actuating means is passing current through a spring retaining post to cause a reduced section to rupture thereby to release the spring pressure to actuate said pin.

6. A disconnect device for disconnecting a generator from an engine comprising a generator having a housing with a rotor supported for rotation therein, a quick attach-detach mounting flange for mounting said generator to said engine, a torsional drive shaft for said rotor, said shaft having a splined section adapted for mating with an engine drive member, a bracket member having outward extending projection secured to said shaft between said rotor and, said shaft having a shear section between said bracket and said splined section said splined member, said mounting flange having a spring loaded pin assembly therein positioned adjacent to said bracket member, and means for releasing said spring to actuate said pin into contact with said bracket member to stop rotation of said shaft, thereby causing said shaft to shear.

7. The combination as set forth in claim 6 in which said spring releasing means is passing a current through a post holding said spring in compression to cause said post to part thereby releasing said spring.

References Cited by the Examiner
UNITED STATES PATENTS

| | | | |
|---|---|---|---|
| 2,509,813 | 5/1950 | Dineen | 192—101 |
| 2,727,371 | 12/1955 | Troeger et al. | 64—28 |
| 2,964,931 | 12/1960 | Sorenson | 64—28 |

DAVID J. WILLIAMOWSKY, *Primary Examiner.*